United States Patent [19]

McMackin et al.

[11] 4,218,278
[45] Aug. 19, 1980

[54] APPARATUS AND METHOD FOR FABRICATING STAKE FLAGS

[76] Inventors: Edwin E. McMackin; Waymon E. McMackin, both of 131 Yorktown, Dallas, Tex. 75208

[21] Appl. No.: 916,718

[22] Filed: Jun. 19, 1978

[51] Int. Cl.² ............... B65H 81/06; B32B 31/18; B32B 31/20
[52] U.S. Cl. .................. 156/187; 156/193; 156/202; 156/215; 156/263; 156/264; 156/475; 156/483; 156/521; 156/524; 156/526; 156/527
[58] Field of Search ............... 156/263, 264, 256, 269, 156/270, 185, 187, 190, 193, 202, 213, 215, 475, 483, 516, 521, 524, 526, 527

[56] References Cited

U.S. PATENT DOCUMENTS

| | | | |
|---|---|---|---|
| 794,873 | 7/1905 | Mayhew | 156/264 |
| 1,353,933 | 9/1920 | Morris | 156/264 X |
| 2,331,067 | 10/1943 | Young | 156/269 X |
| 3,362,863 | 1/1968 | Larsson et al. | 156/185 |
| 3,577,293 | 5/1971 | Ritterhoff | 156/187 X |
| 3,695,965 | 10/1972 | Current et al. | 156/187 |
| 4,026,754 | 5/1977 | Bogdanski et al. | 156/521 |
| 4,111,737 | 9/1978 | Wesley | 156/187 X |
| 4,157,719 | 6/1979 | Dewoskin | 156/269 X |
| 4,166,300 | 9/1979 | Savich | 156/521 X |

*Primary Examiner*—Harold Ansher
*Attorney, Agent, or Firm*—Peter J. Murphy

[57] ABSTRACT

A stake flag consists of a segment of flagging strip adhesively secured to the end of a wire stake. The apparatus includes a roller chain conveyor, driven at a continuous rate of speed, having fixed carriers for conveying the stakes transversely in parallel spaced relation. A conveyor for a strip of flagging material carries the strip in a path coincident with the path of the wire stakes, with one end of the stakes overlying the strip. A stake hopper, with automatic release, releases stakes sequentially to the conveyor carriers; and a glue gun deposits a quantity of glue on each stake end, and on the adjacent underlying portion of the strip, to provide immediate adhesion of the stake and strip. A rotating cutter blade coacts with a backing roller to sever the flagging strip into flagging segments adhering to respective stakes; and a rotating mechanism rotates the stake in the conveyor, after severance, to fold and press the segment onto itself and onto the stake.

12 Claims, 12 Drawing Figures

APPARATUS AND METHOD FOR FABRICATING STAKE FLAGS

BACKGROUND AND SUMMARY OF THE INVENTION

This invention relates to an improved automatic apparatus and a method for fabricating stake flags from wire stakes and a strip of flagging material. This invention is concerned with the fabrication of stake flags which consist of a steel wire stake having bonded thereto a strip of flagging material. Such flags may also be referred to as pin flags, data flags, or survey flags and have wide use particularly by surveyors and engineers.

A principal object of this invention is to provide such apparatus which is simple and reliable in operation, and an improved method which may be practiced by such apparatus.

Another object of this invention is to provide apparatus for the automatic fabrication of stake flags and which provides adequate production with minimum maintenance and a method which may be practiced by such apparatus.

A more particular object of this invention is to provide a method and apparatus for the fabrication of stake flags, which enable the conveying of the flag stakes and flagging material at a continuous rate.

These objects are accomplished in apparatus for fabricating stake flags from a plurality of wire stakes and a strip of flagging. The apparatus includes a first conveyor means for conveying wire stakes transversely, in fixed parallel spaced relation at a continuous rate of speed; and a second conveyor means for conveying a strip of flagging at the same continuous rate of speed, and for supporting the strip in a path coincident with the path of one end of the stakes, whereby the one end of the stakes are maintained adjacent to the strip. An adhesive means applies adhesive to the one ends of the stakes and the adjacent portion of the flagging. Cutter means is disposed at a fixed station relative to the second conveyor means for severing the flagging a selected distance behind each stake, and ahead of a succeeding stake, to sever a flagging segment from the strip and to form a lead tab for the flagging segment of the stake. A rotating means rotates the stake relative to the plane of the flagging, to rotate the lead tab to a position contiguous to the trailing flagging, and to further roll the assembly of flagging and stakes to effect compression of the flagging and stake.

These objects are also accomplished in a method for fabricating marker flags from lengths of wire stakes and strips of flagging comprising the steps: conveying a plurality of stakes transversely in fixed parallel spaced relation at a continuous rate; conveying a strip of flagging, at the same continuous rate, along a path coincident with the path of one end of the conveyed stakes, whereby said flagging and said one end of the stakes are conveyed in contiguous relation; applying an adhesive to said one end of the stakes and to adjacent portions of said flagging, to effect immediate adhesion of the stakes and flagging; severing said flagging at a fixed station, behind each stake to release a flagging segment secured to that stake and to form a lead tab for a succeeding flagging segment; and rotating said stake and flagging segment, to rotate said lead tab to a position contiguous to the following flagging portion; and further rotating said assembly of stake and flagging to effect compression of said flagging and stake.

The novel features and the advantages of the invention, as well as additional objects thereof, will be understood more fully from the following description when read in connection with the accompanying drawings.

DESCRIPTION OF THE PREFERRED EMBODIMENTS

Figure 10:
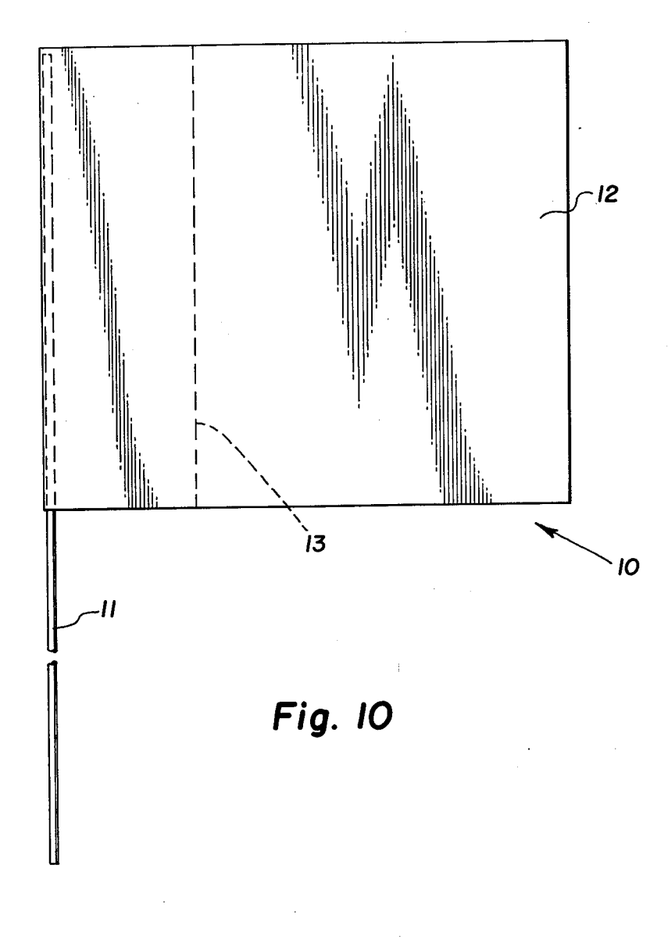
FIG. 10 is a view of a finished stake flag.

Referring to FIG. 10, a typical stake flag 10 capable of being fabricated by the apparatus and method of the invention, consists of a steel wire stake 11 having a ⅛" or 1/16" diameter for example, and a segment of flagging 12. A preferred form of flagging material is a liner embossed plastic film having a thickness of 4 to 7 mils, with the film having an actual thickness of 1½ to 4 mils and being fabricated from polyvinyl chloride for example. The flagging material may be produced in a number of colors. Typical sizes of the flag may be 2"×3", and 4"×5", secured to stakes having lengths from 21" to 36" for example.

Referring to the drawings, apparatus according to the invention includes a base frame 15 fabricated from suitable steel angles, channels and straps, for example. This frame provides a generally horizontal table for the several components of the apparatus. These components include a drive mechanism 16, a stake conveyor 17, a stake hopper 18, a flagging conveyor 19, a glue gun 20, a heater 21, a flagging cutter mechanism 22, a stake rotating mechanism 23 and a discharge conveyor 24.

For orientation of parts, reference will be made to the feed end and the discharge end of the apparatus; with the stake hopper 18 being mounted at the feed end of the apparatus, and with the drive mechanism 16 and the discharge conveyor 24 being mounted at the discharge end of the apparatus.

Figures 1, 7:
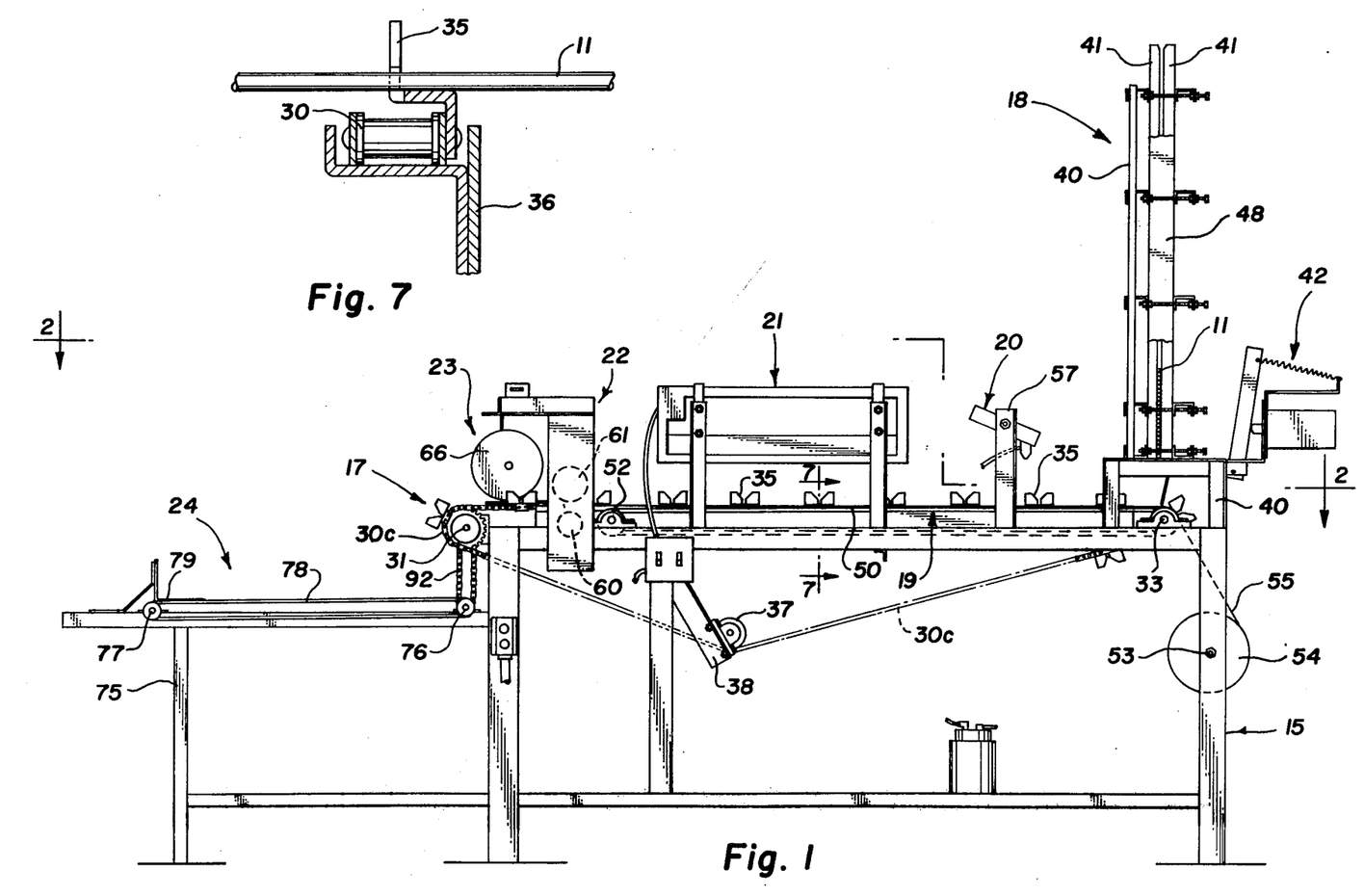
FIG. 1 is a side elevation of the apparatus according to the invention.
FIG. 7 is a fragmentary sectional view taken along the line 7—7 of FIG. 1 illustrating details of the stake conveyor.
Figure 2:
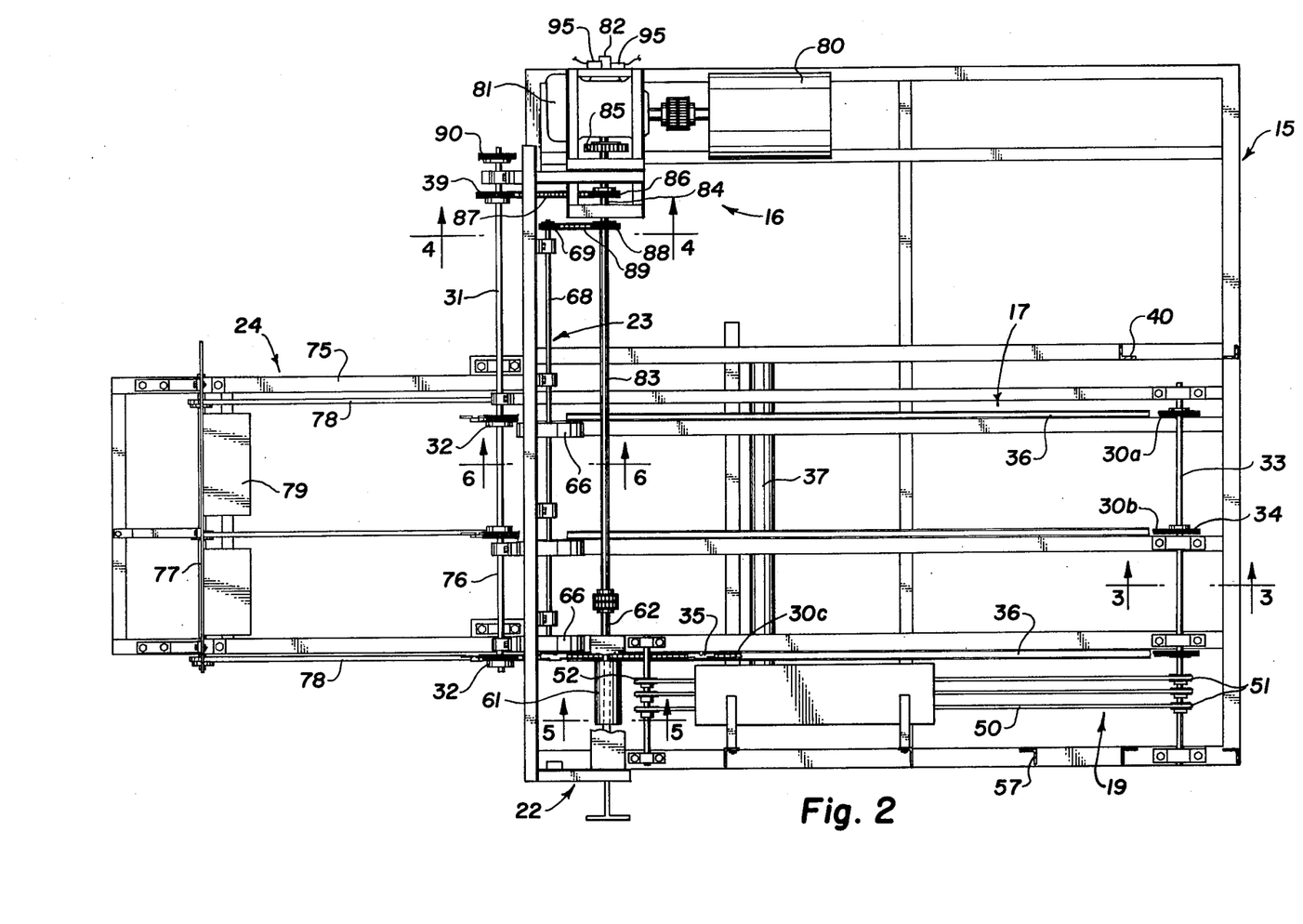
FIG. 2 is a plan view of apparatus according to the invention taken along the line 2—2 of FIG. 1.
Figure 3:
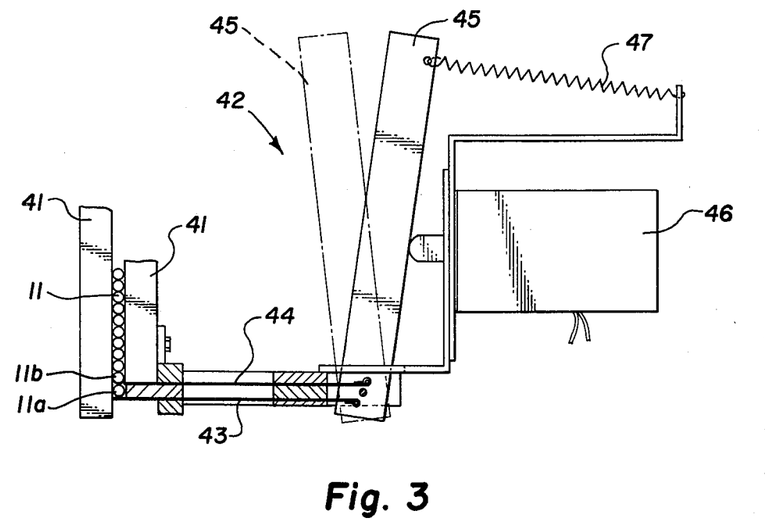
FIG. 3 is a fragmentary sectional view taken along the line 3—3 of FIG. 2 illustrating the hopper release mechanism.

The stake conveyor 17 consists of three endless roller chains 30a, 30b, and 30c, laterally spaced and supported between suitable sprockets on a drive shaft 31 and an idler shaft 33 disposed at the discharge and feed ends respectively. The drive shaft has drive sprockets 32 nonrotatably mounted thereon; and idler shaft has idler sprockets 34 nonrotatably mounted thereon. Each roller chain carries a plurality of stake carriers 35 which are mounted on the chains in spaced relation. These carriers 35 may be fabricated from sheet metal for example. As best seen in FIG. 7, with reference to the horizontal conveyor plane, these carriers extend upward and include slots transverse to the plane which are flared at the upper end to receive the stakes which are released from the stake hopper 18. These carriers then carry the stakes in spaced relation toward the discharge end of the apparatus, and permit rotation of the stakes within the carriers by the stake rotating mechanism 23 to be described. As best seen in FIG. 7, each of the conveyor chains 30a, 30b, and 30c is supported in its horizontal conveyor plane by means of guide track assemblies 36 fabricated from sheet metal and suitably secured to longitudinal members of the frame 15 for example. A mechanism for preventing slack in the conveyor chain consists of a transverse steel roller 37 rotatably supported on suitable brackets 38 and traversing the conveyor chains. The stake hopper 18 is mounted on the frame 15 above the feed end of the stake conveyor 17, and includes a frame 40 for supporting vertical bars 41 which provide a storage slot for a single vertical stack of stakes 11. An end plate 48 locates one end of the stakes relative to the flagging conveyor 19. A stake release mechanism 42 is mounted at the lower end of the hopper frame and includes a lower slide 43 and an upper slide 44 actuated by a rocker arm 45 for releasing single stakes, to drop by gravity into the conveyor stake carriers 35, when actuated by a solenoid 46. As best seen in FIG. 3, in the normal position of the release mechanism, the lower slide 43 supports the stack of stakes 11. To release a single stake, the rocker arm first rotates counterclockwise (to the phantom line position) to position the upper slide 44 to intercept the second lowermost stake 11b, and the lower slide withdraws to release the lowermost stake 11a. The solenoid 46 is actuated momentarily to this position, and is returned to the normal position by spring 47 so that the next stake 11b is positioned for release on the next operating cycle. The timing control for the solenoid will be described subsequently.

The flagging conveyor 19 consists of three side-by-side V-belts 50, supported between drive pulleys 51 and idler pulleys 52 to define an upper support plane which coincides with the plane of the stakes conveyed by the stake conveyor 17. The drive pulleys 51 are nonrotatably mounted on the idler shaft 33 of the stake conveyor, and have an effective diameter corresponding to that of the idler sprockets 34 so that the flagging conveyor moves at the same linear speed as the stake conveyor. The idler pulleys 52 are nonrotatably mounted on a suitable idler shaft. A spindle 53, for supporting a spool 54 of flagging strip 55, is provided at the feed end of the frame.

The glue gun 20 is mounted on the frame 15 by means of a suitable adjustable bracket 57, adjacent to the feed end of the conveyor 19, to direct a desired pattern of glue onto the flagging strip 55. The glue is supplied to the gun from a suitable reservoir, not shown. The gun is air operated and controlled by means of a solenoid valve through a timing control to be described. The pattern of glue is deposited on the flagging strip 55 and the overlying end of a stake 11; and the glue is of a consistency that the flagging will immediately adhere to the stake. Preferably the glue is fast curing and the curing begins immediately.

The heater 21 is preferably a form of electrical radiant heater, which is mounted on the frame by means of suitable brackets and directs heat downwardly onto the flagging and stakes which pass beneath it. The heater provides for initial curing of the glue.

The cutter mechanism 22 is located adjacent to the discharge end of the apparatus and immediately adjacent to the discharge end of the flagging conveyor. This mechanism includes a cylindrical backing roller 60, mounted to be freely rotatable with its uppermost surface in the plane of the flagging conveyor 19, and a cutter rotor 61 nonrotatably mounted on a drive shaft 62, for rotation on an axis parallel to that of the backing roller. The cutter rotor is provided with a longitudinal radial slot for receiving an elongated cutter blade 63 having a cutting edge parallel with the axis of rotation; and the backing roller and cutting rotor are positioned relative to each other so that the cutter blade impinges the backing roller. Preferably, the peripheral speed of the blade cutting edge corresponds to the linear speed of the flagging strip moving through the cutter mechanism. The backing roller is preferably a steel roller; and the cutter blade is fabricated from steel but having a lesser hardness, so that the backing roller will last through many replacements of the cutter blade. By way of example the backing roller may have a hardness of 56 Rockwell C while the cutter blades may have a hardness of 45 Rockwell C. The cutter blades may be fabricated from a material known as "rule die" for example. The spacing of the backing roller and cutter rotor may be such that the blade cutting edge actually interferes with the backing roller service to the extent of 0.002 inch.

Figures 4, 5, 6, 8:
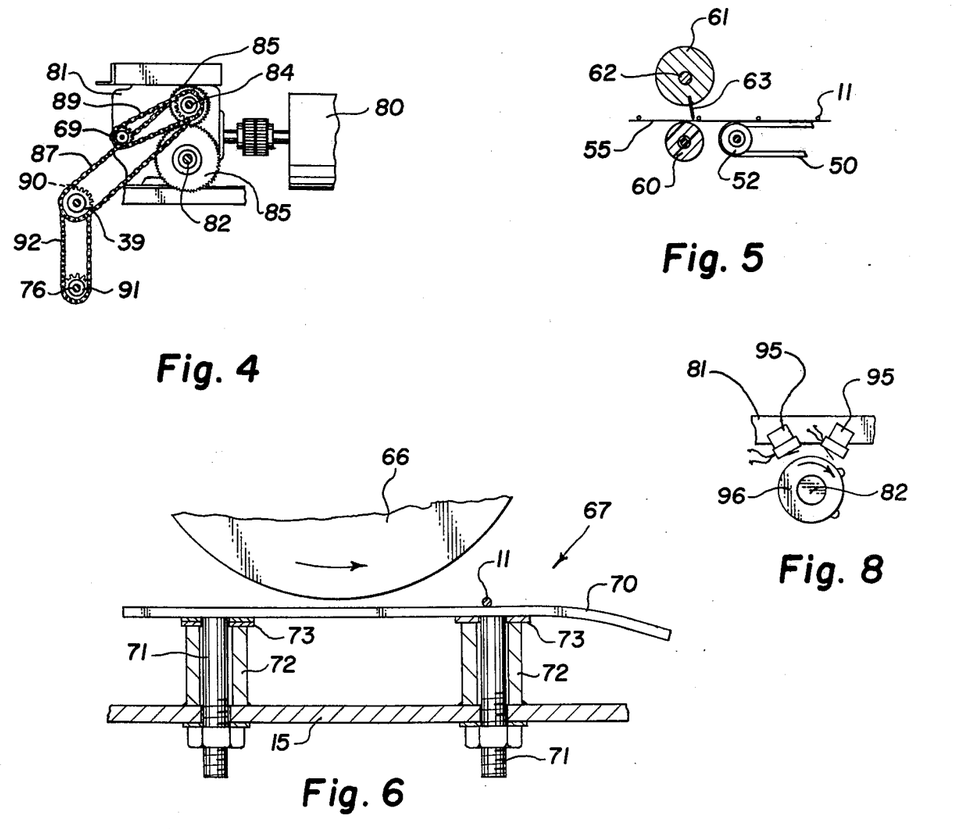
FIG. 4 is a fragmentary sectional view taken along the line 4—4 of FIG. 2 illustrating a portion of the drive mechanism.
FIG. 5 is a fragmentary sectional view taken along the line 5—5 of FIG. 2 illustrating the cutter mechanism.
FIG. 6 is a fragmentary sectional view taken along the line 6—6 of FIG. 2 illustrating details of the wire rolling mechanism.
FIG. 8 is a fragmentary detail view of control switches and actuator cams.

The stake rotating mechanism 22 consists of a plurality of rubber wheels 66, which coact with respective backing plates 67 mounted on the frame and disposed in the plane of the stakes conveyed by the stake conveyor. The clearance between the backing plates and the wheels is less than the diameter of the stakes. Preferably the wheels have cylindrical drive surfaces. As the stakes pass between the backing plate and wheels, the wheels tend to drive the stakes in a direction opposite to that of the conveyor travel; and this imparts a rotation to the stakes which are confined in the slots of conveyor carriers 35. The purpose for this rotation imparted to the stakes will be described subsequently. The rubber rollers 66 are nonrotatably mounted on a roller drive shaft 68, which also carries driven sprocket 69 driven by the drive mechanism as will be described. A backing plate assembly 67, particularly illustrated in FIG. 6, includes a flat plate 70 having a rolled leading edge and having integral studs 71. The assembly is supported on a member of the frame 15 by means of spacer sleeves 72 and suitable shims 73 for precise location of the plates 70 relative to the periphery of the roller 66. The assembly is secured to the frame by means of suitable hex nuts.

Figure 9A:
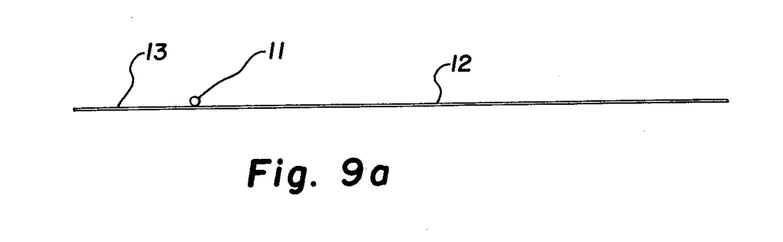
FIGS. 9a, 9b, and 9c are diagrammatic views illustrating the rolling of the marker flag to secure the flagging to the wire stake.
Figure 9B:
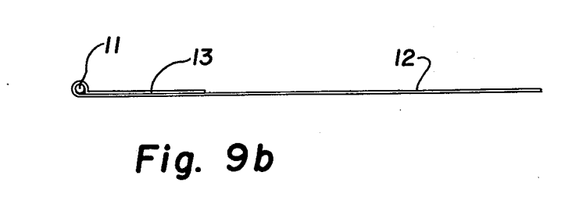
Figure 9C:
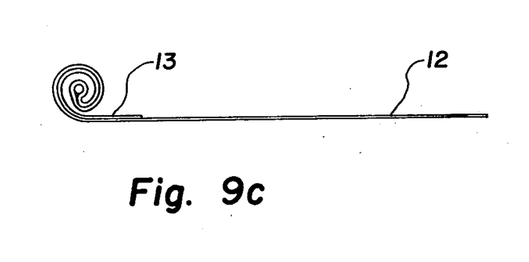

The function of the stake rotating mechanism will now be described with reference to FIGS. 9a, 9b and 9c, which illustrate three stages in the fabrication of the flag as viewed from the flag end of a stake flag. FIG. 9a illustrates the condition of a flagging segment 12 attached to the stake 11, immediately following the severing of the segment from the flagging strip 55, and just prior to engagement of the stake with the wheels 66. In this condition, the lead tab 13 is in the same plane as the trailing flagging portion 12. Upon engagement with the wheels 66, the initial rotation of the stake rotates and folds the lead tab as illustrated in FIG. 9b into overlying contiguous relation with the trailing portion; and further rotation of the stake causes a rolling of the flag on the stake in a scroll-like manner, illustrated in FIG. 9c, to effect compression and more secure bonding of the lead tab to the flagging, and also of the flagging to the stake. Preferably, the stake will be rotated up to two turns while passing through the rotating mechanism. In FIG. 9c, a very loose scroll is depicted for clarity; however, the scroll will be sufficiently tight to effect compression, as stated.

The discharge conveyor 24 consists of an auxiliary frame 75 rotatably supporting parallel drive and driven shafts 76 and 77 respectively, which carry respective pulleys for a plurality of V-belts 78. The V-belts define a generally horizontal planar conveyor surface for carrying the stake flags 10 away from the discharge end of the stake conveyor 17 to a storage rack 79. As the stake carriers 35 are carried around the drive sprockets 32, the slots of the carriers release the stake flags by gravity onto the discharge conveyor.

The drive mechanism 16 for the apparatus includes an electric drive motor 80 coupled to a gear box 81 by a suitable flexible coupling. The gear box output shaft 82 is directly coupled to the main drive shaft 83 which extends to the opposite side of the apparatus for direct coupling to the cutter shaft 62. A jack shaft 84 is supported above and parallel to the shafts 82 and 83, and is driven from the output shaft 82 by gears 85. The jack shaft carries a first drive sprocket 86 which is coupled to the driven sprocket 39 of the stake conveyor drive shaft 31 by means of a roller chain 87. The jack shaft carries a second drive sprocket 88 for driving the driven sprocket 69 of the wheel drive shaft 68, by means of a roller drive chain 89.

The discharge conveyor 24 is driven from the stake conveyor shaft 31 by means of drive pulley 90 and driven pulley 91 mounted on shaft 76, coupled by a roller chain 92.

The timing control for the apparatus is provided by a pair of cam operated switches 95 mounted on the gear box to be actuated by a respective pair of activator cams 96 nonrotatably mounted on the projecting end of the gear box output shaft 82. The timing of the apparatus is related to this output shaft, since this is directly coupled to the cutter rotor 61. In the described apparatus, each revolution of the cutter rotor represents the production of one stake flag and, in a sense, one operating cycle. For each cycle, one stake is discharged from the stake hopper 18 and the solenoid 46 is controlled by one of these cams and switches. Similarly the glue gun is operated once each cycle, and this is controlled by the other of the cams and switches. The cams are adjustable relative to the shaft to control these functions with the desired timing. One of the cams and microswitches may also be utilized to control an appropriate counter for the output of the apparatus.

To change the setup of the apparatus for fabricating a flag having a longer length of flagging, for example, it will be necessary to change the distance between the stake carriers 35 on the conveyor chains; and this may best be accomplished by substituting new conveyor chains with the carriers premounted in the desired space relationship. It will also be necessary to change the speed of the two conveyors 17 and 19 so that a greater length of flagging will pass through the cutter mechanism for each revolution of the cutter rotor; and this may be accomplished merely by changing the size of the conveyor drive sprocket 86. It may also be necessary to change the timing for the stake release and for the discharge of the glue gun 20, relative to the stake conveyor carriers. It will be seen that the changing of the setup for different size stake flags is a relatively simple operation.

OPERATION AND METHOD

The operation of the above described apparatus is quite apparent from the foregoing description. For starting the feed of the flagging strip 55 it is only necessary that the lead end of the strip be placed in an appropriate position of the flagging conveyor 19 and that the glue be discharged onto the flagging adjacent to one or two stakes 11; and the adhesive effect of the glue will be insufficient that the stakes and the action of the flagging conveyor carrying the flagging strip through the apparatus. Subject to the loading of the stake hopper, the loading of the glue reservoir and the loading of the flagging spool, the operation is entirely automatic. The counter may include an appropriate signaling device so that the operator will be alerted when an appropriate number of stake flags have been finished, so that he may assemble these into appropriate bundles or packages.

The above described apparatus is one form of apparatus for practicing a method for fabricating stake flags, which method includes the following steps. A plurality of stakes are conveyed in spaced relation at a continuous rate of speed; and are conveyed in a generally planar path in a direction perpendicular to the orientation of the stakes. A strip of flagging is conveyed at the same continuous rate of speed along a path coincident with, and in the same plane as, the path of one end of the conveyed stakes, so that the one ends of the stakes overlie the strip of flagging. A quantity of adhesive is applied at a fixed station, simultaneously to the end of the stake overlying the flagging and to the adjacent flagging, as the stake and flagging are conveyed in relation to the glue dispenser. An initial bonding of the flagging to the stake is effected by the inherent adhesive effect of the glue; and the initial curing of the glue may be accelerated by means of the application of heat. The flagging is received at a fixed station a selected distance behind each stake to define the length of flagging and release a flagging segment from the strip, and to form a lead tab for the succeeding flagging segment. Following the severing of the flagging, the stake with the flagging adhering thereto is rotated to initially bring the lead tab to a position overlying and contiguous to the following flagging portion, and to then rotate the assembly of stake and flagging to effect compression of the lead tab and trailing flagging portion to complete the bonding of the flagging to itself and to the wire stake.

More particularly, the method involves severing the strip of flagging by passing it between a backing roller and a cutter rotor rotatable about axes perpendicular to the path of the strip and to the direction of strip movement, and impinging the backing roller with a radial cutting blade mounted longitudinally in the rotor.

What has been described is a novel form of apparatus for the automatic fabrication of stake flags fabricated from wire stakes and a strip of flagging. A particular feature of the apparatus is that the stakes and flagging are fed through the apparatus at a smooth and continuous rate of speed, with the apparatus performing the severing of the flagging to form the individual flagging segments secured to each stake, and with the apparatus securing the bonding of the flagging strip to the stake, all without interruption of the movement of the components through the apparatus. A particular advantage of this form of apparatus is that the machine is smooth operating and requires very little maintenance, resulting in minimum loss of production time.

An important feature of the invention is the particular form of cutting mechanism, which is very effective to sever the strip of flagging through many cycles of operation without interruption of the movement of the strip; and in which the cutter blade is effective for many cycles of operation, and in which the replacement of the cutter blade is accomplished with little down time.

Another important feature of the apparatus and method is the apparatus for and method of rotating the flag stake, with the flag bonded to it by means of the adhesive, in a manner to effect compression of the flag on itself and onto the stake for more secure bonding.

An important advantage of the method is that the fabrication is accomplished while the components and the assembled flags are conveyed at a continuous and uninterrupted rate.

While the preferred embodiments of the invention have been illustrated and described, it will be understood by those skilled in the art that changes and modifications may be resorted to without departing from the spirit and scope of the invention.

What is claimed is:

1. Apparatus for fabricating stake flags from a plurality of wire stakes and a strip of flagging comprising
   first conveyor means for conveying wire stakes transversely in fixed parallel spaced relation at a continuous rate of speed;
   second conveyor means for conveying a strip of flagging at the same continuous rate of speed, and for supporting said strip of flagging in a path coincident with the path of one end of said stakes, whereby said one end of said stakes are maintained adjacent to said strip of flagging;
   means for applying adhesive to said one ends of said stakes and the adjacent portions of said flagging, during conveyance in said coincident paths, to effect adhesion thereof
   cutter means disposed at a fixed station relative to said second conveyor means for severing said flagging strip, adhering to said stakes, a selected distance behind each stake and ahead of a succeeding stake, to form a flagging segment associated with each stake, including a lead tab and a trailing portion;
   means operative on each stake, during conveyance thereof following the forming of its respective flagging segment, for rotating said stake about its support axis, to rotate said lead tab to a position contiguous to said trailing portion to effect the bonding thereof.

2. In apparatus as set forth in claim 1
   said cutter means comprising a cutter rotor and a backing rotor rotatably mounted on parallel axes; said cutter rotor carrying a cutter blade disposed to engage the peripheral surface of said backing roller, to effect the severing of flagging passing between said rotors.

3. In apparatus as set forth in claim 1
   said stake rotating means comprising a plurality of backing plates and a plurality of coacting resilient wheels;
   said backing plates having surfaces disposed in the path of the stakes conveyed by said first conveyor means; said wheels having peripheral surfaces disposed in spaced relation to said backing plates, to provide a clearance between said plates and said wheels less than the diameter of said stakes;
   and means for rotating said wheels at a rate to rotate the stakes a desired number of turns as the stakes are conveyed through said stake rotating means.

4. In apparatus as set forth in claim 1
   said means for rotating a stake comprising means for rotating same a sufficient number of revolutions, to roll the assembly of stake and adhering flagging segment to compress and bond the flagging to itself and to said stake.

5. In apparatus as set forth in claim 1
   heating means disposed between said adhesive applying means and said cutter means for partially curing the adhesive applied to said strip and said stakes.

6. In apparatus as set forth in claim 1
   said first conveyor means comprising a plurality of parallel roller chains; each chain carrying a plurality of longitudinally spaced stake carriers; said stake carriers supporting said stakes for rotation therein.

7. In apparatus as set forth in claim 6
   hopper means, for supporting a plurality of stakes, overlying said first conveyor means; release means associated with said hopper means for releasing stakes singly to said conveyor stake carriers;
   and timing means for effecting release of stakes from said hopper means to successive stake carriers.

8. A method for fabricating stake flags from wire stakes and a strip of flagging, comprising the steps
   conveying a plurality of stakes transversely in parallel spaced relation at a continuous rate;
   conveying a strip of flagging, at the same continuous rate, along a path coincident with the path of one end of the conveyed stakes, whereby said flagging strip and said one end of the stakes are conveyed in adjacent relation;
   applying an adhesive to said one end of the stakes and to adjacent portions of said flagging strip, during conveyance in said coincident paths, to effect adhering of the flagging strip to the stakes;
   severing said adhering flagging strip between successive stakes, a selected distance therefrom, to form a flagging segment associated with each stake, including a lead tab and a trailing portion;
   and rotating said stake and adhering flagging segment about the support axis of said stake and during the conveyance thereof, to position said lead tab contiguous to the following flagging portion to effect the bonding thereof.

9. In a method as set forth in claim 8
   rotating said stake and adhering flagging segment an additional amount to compress said flagging on itself and on said stake to effect the bonding thereof.

10. In a method as set forth in claim 8
    partially curing the adhesive applied to said stakes and to said flagging strip, during the conveyance thereof in coincident paths and prior to the severing of said flagging strip, to enhance the initial adhesion of said flagging strip to said stakes.

11. In a method as set forth in claim 8 severing said flagging strip by passing said strip between a cutter rotor and a backing rotor, and engaging a transverse, radially disposed cutter blade with the peripheral surface of said backing rotor.

12. In a method as set forth in claim 8
spraying said adhesive simultaneously onto said one end of the stake and onto adjacent portions of said flagging strip extending from both sides of respective stake ends.

* * * * *

UNITED STATES PATENT AND TRADEMARK OFFICE
CERTIFICATE OF CORRECTION

PATENT NO. : 4218278

DATED : August 19, 1980

INVENTOR(S) : Edwin E. McMackin and Waymon E. McMackin

It is certified that error appears in the above–identified patent and that said Letters Patent are hereby corrected as shown below:

Column 2, line 41          change "liner" to --linen--;

Column 6, line 44          change "received" to --severed--.

Signed and Sealed this

Twenty-fifth Day of November 1980

[SEAL]

*Attest:*

SIDNEY A. DIAMOND

*Attesting Officer*      *Commissioner of Patents and Trademarks*